United States Patent
Haun et al.

(10) Patent No.: US 6,477,021 B1
(45) Date of Patent: Nov. 5, 2002

(54) BLOCKING/INHIBITING OPERATION IN AN ARC FAULT DETECTION SYSTEM

(75) Inventors: Andy A. Haun, Cedar Rapids, IA (US); Brian G. Grattan, Cedar Rapids, IA (US); Kon B. Wong, Cedar Rapids, IA (US); Robert F. Dvorak, Mt. Vernon, IA (US); Gary W. Scott, Mount Vernon, IA (US)

(73) Assignee: Square D Company, Palatine, IL (US)

( * ) Notice: Subject to any disclaimer, the term of this patent is extended or adjusted under 35 U.S.C. 154(b) by 0 days.

(21) Appl. No.: 09/468,736

(22) Filed: Dec. 21, 1999

Related U.S. Application Data

(63) Continuation-in-part of application No. 09/129,685, filed on Aug. 5, 1998, now Pat. No. 6,259,996, which is a continuation-in-part of application No. 09/026,193, filed on Feb. 19, 1998, now Pat. No. 6,246,556.

(51) Int. Cl.[7] ................................................. H02H 3/00
(52) U.S. Cl. ......................................... 361/42; 324/520
(58) Field of Search ...................... 361/42–50; 324/509, 324/510, 511, 520, 522, 536

(56) References Cited

U.S. PATENT DOCUMENTS

| | | | |
|---|---|---|---|
| 30,678 A | 7/1860 | Van Zeeland et al. | 361/44 |
| 2,808,566 A | 10/1957 | Douma | 324/127 |
| 2,832,642 A | 4/1958 | Lennox | 299/132 |
| 2,898,420 A | 8/1959 | Kuze | 200/87 |
| 2,971,130 A | 2/1961 | Diebold | 317/16 |
| 3,471,784 A | 10/1969 | Arndt et al. | 324/126 |
| 3,538,241 A | 11/1970 | Rein | 174/143 |
| 3,588,611 A | 6/1971 | Lambden et al. | 317/31 |
| 3,600,502 A | 8/1971 | Wagenaar et al. | 174/143 |
| 3,622,872 A | 11/1971 | Boaz et al. | 324/52 |
| 3,660,721 A | 5/1972 | Baird | 317/16 |
| 3,684,955 A | 8/1972 | Adams | 324/72 |
| 3,716,757 A | 2/1973 | Rodriguez | 317/40 R |
| 3,746,930 A | 7/1973 | Van Best et al. | 317/31 |
| 3,775,675 A | 11/1973 | Freeze et al. | 324/51 |
| 3,812,337 A | 5/1974 | Crosley | 235/153 AC |
| 3,858,130 A | 12/1974 | Misencik | 335/18 |
| 3,868,549 A | 2/1975 | Schaefer et al. | 317/11 E |
| 3,869,665 A | 3/1975 | Kenmochi et al. | 324/72 |

(List continued on next page.)

FOREIGN PATENT DOCUMENTS

| | | | |
|---|---|---|---|
| CA | 2267490 | 3/1999 | H02H/3/00 |
| CA | 2256208 | 6/1999 | H01H/9/50 |
| CA | 2256243 | 6/1999 | H02H/3/16 |

(List continued on next page.)

OTHER PUBLICATIONS

Paolantonio, Antonio N., P.E., Directional Couplers, R.F. Design, pp. 40–49 (Sep/Oct. 1979).

Duenas, Alejandro J., Directional Coupler Design Graphs For Parallel Coupled Lines And Interdigitated 3 dB Couplers, RF Design, pp. 62–64 (Feb. 1986).

(List continued on next page.)

*Primary Examiner*—Ronald W. Leja
(74) *Attorney, Agent, or Firm*—Kareem M. Irfan; Larry I. Golden

(57) ABSTRACT

A system for determining whether arcing is present in an electrical circuit includes a sensor for monitoring a current waveform in the electrical circuit, and an arc fault detection circuit which determines whether an arc fault is present in response to the sensor. The arc fault detection circuit includes a controller which produces a trip signal in response to a determination that an arcing fault is present in the electrical circuit, and an inhibit/blocking function for preventing the production of the trip signal under one or more predetermined conditions.

36 Claims, 4 Drawing Sheets

U.S. PATENT DOCUMENTS

| | | |
|---|---|---|
| 3,878,460 A | 4/1975 | Nimmersjo .................. 324/52 |
| 3,911,323 A | 10/1975 | Wilson et al. ................. 317/18 |
| 3,914,667 A | 10/1975 | Waldron ....................... 317/36 |
| 3,932,790 A | 1/1976 | Muchnick ................. 317/18 D |
| 3,939,410 A | 2/1976 | Bitsch et al. .................. 324/72 |
| 4,052,751 A | 10/1977 | Shepard ....................... 361/50 |
| 4,074,193 A | 2/1978 | Kohler ....................... 324/126 |
| 4,081,852 A | 3/1978 | Coley et al. ................... 361/45 |
| 4,087,744 A | 5/1978 | Olsen .......................... 324/51 |
| 4,130,850 A | 12/1978 | Cronin et al. ................. 361/54 |
| 4,156,846 A | 5/1979 | Harrold et al. ............. 324/158 |
| 4,166,260 A | 8/1979 | Gillette ........................ 335/20 |
| 4,169,260 A | 9/1979 | Bayer ......................... 340/562 |
| 4,214,210 A | 7/1980 | O'Shea ....................... 455/282 |
| 4,233,640 A | 11/1980 | Klein et al. .................... 361/44 |
| 4,245,187 A | 1/1981 | Wagner et al. ................ 324/54 |
| 4,251,846 A | 2/1981 | Pearson et al. ............... 361/30 |
| 4,264,856 A | 4/1981 | Frierdich et al. ............. 322/25 |
| 4,316,187 A | 2/1982 | Spencer ...................... 340/664 |
| 4,344,100 A | 8/1982 | Broersma, Jr. et al. . 424/273 R |
| 4,354,154 A | 10/1982 | Olsen .......................... 324/51 |
| 4,356,443 A | 10/1982 | Emery ......................... 324/51 |
| 4,378,525 A | 3/1983 | Burdick ...................... 324/127 |
| 4,387,336 A | 6/1983 | Joy et al. ...................... 324/51 |
| 4,459,576 A | 7/1984 | Fox et al. ..................... 336/84 |
| 4,466,071 A | 8/1984 | Russell, Jr. ................. 364/492 |
| 4,477,855 A | 10/1984 | Nakayama et al. ........... 361/54 |
| 4,587,588 A | 5/1986 | Goldstein ..................... 361/54 |
| 4,616,200 A | 10/1986 | Fixemer et al. ............... 335/35 |
| 4,631,621 A | 12/1986 | Howell ........................ 361/13 |
| 4,639,817 A | 1/1987 | Cooper et al. ................ 361/62 |
| 4,642,733 A | 2/1987 | Schact ......................... 361/42 |
| 4,644,439 A | 2/1987 | Taarning ...................... 361/87 |
| 4,652,867 A | 3/1987 | Masot ........................ 340/638 |
| 4,658,322 A | 4/1987 | Rivera ......................... 361/37 |
| 4,697,218 A | 9/1987 | Nicolas ....................... 633/882 |
| 4,702,002 A | 10/1987 | Morris et al. ................. 29/837 |
| 4,707,759 A | 11/1987 | Bodkin ....................... 831/642 |
| 4,723,187 A | 2/1988 | Howell ........................ 361/13 |
| 4,771,355 A | 9/1988 | Emery et al. ................. 361/33 |
| H536 H | 10/1988 | Strickland et al. .......... 324/456 |
| H538 H | 11/1988 | Betzold ........................ 89/134 |
| 4,810,954 A | 3/1989 | Fam .......................... 324/142 |
| 4,816,958 A | 3/1989 | Belbel et al. .................. 361/93 |
| 4,833,564 A | 5/1989 | Pardue et al. ................ 361/93 |
| 4,835,648 A | 5/1989 | Yamauchi ..................... 361/14 |
| 4,839,600 A | 6/1989 | Kuurstra .................... 324/127 |
| 4,845,580 A | 7/1989 | Kitchens ...................... 361/91 |
| 4,847,719 A | 7/1989 | Cook et al. ................... 361/13 |
| 4,853,818 A | 8/1989 | Emery et al. ................. 361/33 |
| 4,858,054 A | 8/1989 | Franklin ...................... 361/57 |
| 4,866,560 A | 9/1989 | Allina ........................ 361/104 |
| 4,878,144 A | 10/1989 | Nebon ......................... 361/96 |
| 4,882,682 A | 11/1989 | Takasuka et al. ........... 364/507 |
| 4,893,102 A | 1/1990 | Bauer ......................... 355/132 |
| 4,901,183 A | 2/1990 | Lee ............................. 361/56 |
| 4,922,368 A | 5/1990 | Johns .......................... 361/62 |
| 4,931,894 A | 6/1990 | Legatti ........................ 361/45 |
| 4,939,495 A | 7/1990 | Peterson et al. ............. 337/79 |
| 4,949,214 A | 8/1990 | Spencer ....................... 361/95 |
| 4,969,063 A | 11/1990 | Scott et al. ................... 361/93 |
| 5,010,438 A | 4/1991 | Brady ......................... 361/56 |
| 5,047,724 A | 9/1991 | Boksiner et al. ............ 324/520 |
| 5,051,731 A | 9/1991 | Guim et al. ................ 340/638 |
| 5,121,282 A | 6/1992 | White .......................... 361/42 |
| 5,166,861 A | 11/1992 | Krom ......................... 361/379 |
| 5,168,261 A | 12/1992 | Weeks ........................ 340/515 |
| 5,179,491 A | 1/1993 | Runyan ....................... 361/45 |
| 5,185,684 A | 2/1993 | Beihoff et al. ................ 361/45 |
| 5,185,685 A | 2/1993 | Tennies et al. ............... 361/45 |
| 5,185,686 A | 2/1993 | Hansen et al. ................ 361/45 |
| 5,185,687 A | 2/1993 | Beihoff et al. ................ 361/45 |
| 5,206,596 A | 4/1993 | Beihoff et al. .............. 324/536 |
| 5,208,542 A | 5/1993 | Tennies et al. ............. 324/544 |
| 5,223,795 A * | 6/1993 | Blades ....................... 361/113 |
| 5,224,006 A | 6/1993 | MacKenzie et al. .......... 361/45 |
| 5,257,157 A | 10/1993 | Epstein ...................... 361/111 |
| 5,280,404 A | 1/1994 | Ragsdale .................... 361/113 |
| 5,286,933 A | 2/1994 | Pham ..................... 200/144 B |
| 5,307,230 A | 4/1994 | MacKenzie .................. 361/96 |
| 5,321,574 A | 6/1994 | Patrick et al. ................ 361/99 |
| 5,334,939 A | 8/1994 | Yarbrough .................. 324/424 |
| 5,353,014 A | 10/1994 | Carroll et al. .............. 340/638 |
| 5,359,293 A | 10/1994 | Boksiner et al. ............ 324/544 |
| 5,363,269 A | 11/1994 | McDonald ................... 361/45 |
| 5,373,241 A | 12/1994 | Ham, Jr. et al. ............ 324/536 |
| 5,383,084 A | 1/1995 | Gershen et al. ............. 361/113 |
| 5,388,021 A | 2/1995 | Stahl ........................... 361/56 |
| 5,396,179 A | 3/1995 | Domenichini et al. ...... 324/546 |
| 5,412,526 A | 5/1995 | Kapp et al. ................... 361/56 |
| 5,414,590 A | 5/1995 | Tajali ......................... 361/669 |
| 5,420,740 A | 5/1995 | MacKenzie et al. .......... 361/45 |
| 5,424,894 A | 6/1995 | Briscall et al. ............... 361/45 |
| 5,434,509 A | 7/1995 | Blades ....................... 324/536 |
| 5,444,424 A | 8/1995 | Wong et al. ................ 335/172 |
| 5,446,431 A | 8/1995 | Leach et al. ................. 335/18 |
| 5,448,443 A | 9/1995 | Muelleman ................. 361/111 |
| 5,452,222 A | 9/1995 | Gray et al. ................. 364/481 |
| 5,452,223 A | 9/1995 | Zuercher et al. ............ 364/483 |
| 5,459,630 A | 10/1995 | MacKenzie et al. .......... 361/45 |
| 5,473,494 A | 12/1995 | Kurosawa et al. ............. 361/3 |
| 5,477,150 A | 12/1995 | Ham, Jr. et al. ............ 324/536 |
| 5,481,235 A | 1/1996 | Heise et al. .................. 335/18 |
| 5,483,211 A | 1/1996 | Carrodus et al. ............. 335/18 |
| 5,485,093 A | 1/1996 | Russell et al. .............. 324/522 |
| 5,493,278 A | 2/1996 | MacKenzie et al. ........ 340/638 |
| 5,499,189 A | 3/1996 | Seitz .......................... 364/480 |
| 5,506,789 A | 4/1996 | Russell et al. .............. 364/492 |
| 5,510,946 A | 4/1996 | Franklin ...................... 361/56 |
| 5,512,832 A | 4/1996 | Russell et al. .............. 324/522 |
| 5,519,561 A | 5/1996 | Mrenna et al. ............. 361/105 |
| 5,531,617 A | 7/1996 | Marks ........................ 439/723 |
| 5,537,327 A | 7/1996 | Snow et al. ................ 364/483 |
| 5,544,003 A | 8/1996 | Vaughan ..................... 361/625 |
| 5,546,266 A | 8/1996 | Mackenzie et al. ........... 361/93 |
| 5,561,605 A | 10/1996 | Zuercher et al. ............ 364/483 |
| 5,568,371 A | 10/1996 | Pitel et al. .................... 363/39 |
| 5,578,931 A | 11/1996 | Russell et al. .............. 324/536 |
| 5,590,010 A | 12/1996 | Ceola et al. .................. 361/93 |
| 5,590,012 A | 12/1996 | Dollar ........................ 361/113 |
| 5,602,709 A | 2/1997 | Al-Dabbagh ................ 361/85 |
| 5,608,328 A | 3/1997 | Sanderson .................. 324/529 |
| 5,617,019 A | 4/1997 | Etter ...................... 324/117 R |
| 5,638,244 A | 6/1997 | Mekanik et al. .............. 361/62 |
| 5,642,052 A | 6/1997 | Earle ......................... 324/556 |
| 5,646,502 A | 7/1997 | Johnson ........................ 320/5 |
| 5,657,244 A | 8/1997 | Seitz .......................... 364/492 |
| 5,659,453 A | 8/1997 | Russell et al. ................ 361/93 |
| 5,661,645 A | 8/1997 | Hochstein .................... 363/89 |
| 5,682,101 A | 10/1997 | Brooks et al. .............. 324/536 |
| 5,691,869 A | 11/1997 | Engel et al. .................. 361/42 |
| 5,701,110 A | 12/1997 | Scheel et al. ............... 335/132 |
| 5,706,154 A | 1/1998 | Seymour ...................... 361/42 |
| 5,710,513 A | 1/1998 | March ........................ 324/424 |
| 5,726,577 A | 3/1998 | Engel et al. ................ 324/536 |
| 5,729,145 A | 3/1998 | Blades ....................... 324/536 |
| 5,764,125 A | 6/1998 | May ............................ 336/92 |
| 5,805,397 A | 9/1998 | MacKenzie .................. 361/42 |
| 5,805,398 A | 9/1998 | Rae ............................. 361/42 |
| 5,812,352 A | 9/1998 | Rokita et al. ................. 361/58 |
| 5,815,352 A | 9/1998 | Mackenzie ................... 361/42 |

| | | | |
|---|---|---|---|
| 5,818,237 A | 10/1998 | Zuercher et al. ............ 324/536 |
| 5,818,671 A | 10/1998 | Seymour et al. .............. 361/42 |
| 5,825,598 A | 10/1998 | Dickens et al. ............... 361/42 |
| 5,834,940 A | 11/1998 | Brooks et al. ............... 324/424 |
| 5,835,319 A | 11/1998 | Welles, II et al. .............. 361/5 |
| 5,835,321 A | 11/1998 | Elms et al. ................... 361/45 |
| 5,839,092 A | 11/1998 | Erger et al. ................... 702/58 |
| 5,847,913 A | 12/1998 | Turner et al. ................. 361/93 |
| 5,886,861 A | 3/1999 | Parry .......................... 361/42 |
| 5,889,643 A | 3/1999 | Elms ........................... 361/42 |
| 5,896,262 A | 4/1999 | Rae et al. ..................... 361/94 |
| 5,905,619 A | 5/1999 | Jha ............................. 361/93 |
| 5,933,305 A | 8/1999 | Schmalz et al. .............. 361/42 |
| 5,933,308 A | 8/1999 | Garzon ........................ 361/62 |
| 5,946,179 A | 8/1999 | Fleege et al. ................. 361/93 |
| 5,963,406 A | 10/1999 | Neiger et al. ................. 361/42 |
| 5,969,920 A | 10/1999 | MacKenzie .................. 361/42 |
| 5,982,593 A | 11/1999 | Kimblin et al. .............. 361/42 |
| 6,002,561 A | 12/1999 | Dougherly ................... 361/42 |
| 6,031,699 A | 2/2000 | Dollar, II et al. ........... 361/142 |
| 6,040,967 A | 3/2000 | DiSalvo ...................... 361/142 |
| 6,052,046 A | 4/2000 | Ennis et al. ................. 335/202 |
| 6,084,756 A | 7/2000 | Doring et al. ................. 361/45 |
| 6,181,589 B1 | 2/2001 | Clunn ........................ 324/424 |
| 6,198,611 B1 | 3/2001 | Macbeth ....................... 361/42 |
| 6,215,378 B1 | 4/2001 | Gibson et al. ................ 335/18 |
| 6,229,679 B1 | 5/2001 | Macbeth ....................... 361/42 |
| 6,229,680 B1 | 5/2001 | Shea ............................ 361/42 |
| 6,232,857 B1 | 5/2001 | Mason, Jr. et al. ........... 335/18 |

FOREIGN PATENT DOCUMENTS

| | | | |
|---|---|---|---|
| CA | 2277589 | 6/1999 | ............ H02H/3/16 |
| CA | 2265204 | 12/1999 | .......... H01H/83/00 |
| CA | 2305910 | 10/2000 | .......... H01H/71/04 |
| CA | 2307812 | 11/2000 | .......... H01H/83/00 |
| EP | 0094871 A1 | 5/1983 | ............ H02H/1/00 |
| EP | 0502393 A2 | 2/1992 | .......... H01H/23/04 |
| EP | 0615327 A2 | 9/1994 | ............ H02H/1/00 |
| EP | 0649207 A1 | 4/1995 | ............ H02H/3/04 |
| EP | 0748021 A1 | 12/1996 | ............ H02H/1/00 |
| EP | 0762591 A2 | 3/1997 | ............ H02H/3/33 |
| EP | 0802602 A2 | 10/1997 | ............ H02H/1/00 |
| EP | 0813281 A2 | 12/1997 | ............ H02H/1/00 |
| EP | 0911937 A2 | 9/1998 | ......... G01R/31/327 |
| EP | 0945949 A2 | 9/1999 | ............ H02H/1/00 |
| EP | 0954003 A2 | 11/1999 | ............ H02H/1/00 |
| EP | 0974995 A2 | 1/2000 | .......... H01H/71/02 |
| EP | 0981193 A2 | 2/2000 | ............ H01H/1/00 |
| EP | 1005129 | 5/2000 | ............ H02H/1/00 |
| GB | 2177561 A | 6/1985 | ............ H02H/3/00 |
| GB | 2215149 A | 9/1989 | ............ H02H/3/33 |
| GB | 2285886 A | 7/1995 | .......... H01H/71/74 |
| JP | 1-158365 | 6/1989 | .......... G01R/15/02 |
| WO | WO92/08143 | 5/1992 | ............ G01R/31/00 |
| WO | WO 97/30501 | 8/1997 | ............ H02H/1/00 |
| WO | WO00/11696 | 3/2000 | .......... H01H/73/00 |
| WO | WO00/36623 | 6/2000 | .......... H01H/83/04 |
| WO | WO00/39771 | 7/2000 | .......... G08B/21/00 |
| WO | WO01/01536 A1 | 1/2001 | ............ H02H/3/00 |

OTHER PUBLICATIONS

RV4145 Low Power Ground Fault Interrupter, Preliminary Product Specifications Of Integrated Circuits, Raytheon Company Semiconductor Division, pp. 1–8 (no date).

Joubert, Jean–Francois, Feasibility Of Main Service Ground–Fault Protection On The Electrical Service To Dwelling Units, Consultants Electro–Protection Ins., pp. 1–77 (Oct. 26, 1990).

Russell, B.D., Detection Of Arcing Faults On Distribution Feeders, Texas A & M Research Foundation, Final Report, pp. 1–B18 (Dec. 1982).

JP 06308191, dated Apr. 11, 1994, Abstract.

* cited by examiner

BLOCKING/INHIBITING OPERATION IN AN ARC FAULT DETECTION SYSTEM

CROSS-REFERENCE TO RELATED APPLICATIONS

This application is a continuation-in-part of prior application Ser. No. 09/026,193 filed Feb. 19, 1998 now U.S. Pat. No. 6,246,556 and application Ser. No. 09/129,685 filed Aug. 5, 1998 now U.S. Pat. No. 6,259,996, which is a continuation-in-part of said Ser. No. 09/026,193, now U.S. Pat. No. 6,246,556.

FIELD OF THE INVENTION

The present invention relates to the protection of electrical circuits and, more particularly, to the detection of electrical faults of the type known as arcing faults in an electrical circuit, and more particularly still to a blocking or inhibiting function or operation for preventing a trip operation in an arc fault detection system or arc fault circuit interrupter (AFCI) under selected conditions.

BACKGROUND OF THE INVENTION

The electrical systems in residential, commercial and industrial applications usually include a panel board for receiving electrical power from a utility source. The power is then routed through protection devices to designated branch circuits supplying one or more loads. These overcurrent devices are typically circuit interrupters such as circuit breakers and fuses which are designed to interrupt the electrical current if the limits of the conductors supplying the loads are surpassed.

Circuit breakers are a preferred type of circuit interrupter because a resetting mechanism allows their reuse. Typically, circuit breakers interrupt an electric circuit due to a disconnect or trip condition such as a current overload or ground fault. The current overload condition results when a current exceeds the continuous rating of the breaker for a time interval determined by the trip current. A ground fault trip condition is created by an imbalance of currents flowing between a line conductor and a neutral conductor which could be caused by a leakage current or an arcing fault to ground.

Arcing faults are commonly defined as current through ionized gas between two ends of a broken conductor or at a faulty contact or connector, between two conductors supplying a load, or between a conductor and ground. However, arcing faults may not cause a conventional circuit breaker to trip. Arcing fault current levels may be reduced by branch or load impedance to a level below the trip curve settings of the circuit breaker. In addition, an arcing fault which does not contact a grounded conductor or person will not trip a ground fault protector.

There are two types of arcing faults in electrical circuits and wiring: Parallel and Series.

Parallel arcing occurs when there is an arc between two wires or wire-to-ground and the current is limited by the impedance of the voltage source, the wire, and the arc. When the fault is solidly connected and the arc voltage low, the normal breaker trips very quickly with little heating of the wire or damage at the arc point. Occasionally, however, the arc blows apart the faulted components creating a larger arc voltage and reducing the fault current below the trip curve and causing "ticking faults." The consequences of parallel arc damage, are usually much greater than series arcs. The average current may not be sufficient to trip a conventional breaker by heating the bimetal strip or the peak current may not be large enough to trigger the magnetic trip latch. This makes the conventional breaker reasonably effective in protecting against parallel arcing when the peak current is a few hundred amps. Unfortunately, the fault current can be limited by a circuit with too much impedance to immediately trip the thermal-magnetic breaker. Parallel arcing is generally more hazardous than series arcing. The energy released in the arc is much higher with temperatures often in excess of 10,000 Deg. F. This causes pyrolyzation or charring of the insulation, creating conductive carbon paths.

Series arcing begins with corrosion in pin-socket connections or loose connections in series with the electrical loads. The voltage drop across a poor connection begins at a few hundred millivolts and slowly heats and oxidizes or pyrolizes the surrounding materials. The voltage drop increases to a few volts at which time it becomes a "glowing connection" and begins to release smoke from the surrounding polymer insulation. Series arc current is usually limited to a moderate value by the impedance of the electrical load that is connected to the circuit. The amount of power from series arc is typically far is less than in a parallel arc fault. Since the peak current is typically never greater than the design load current, series arcing is much more difficult to detect than parallel arcing. The signature of the series arc is an unusual variation of the normal load current. Series arcing is usually such that the arc current remains well below the trip curve of the breaker. Loose terminal lugs, misarranged or cross-threaded electrical plugs, broken conductor strands inside a wire are typical sources. These arcs cause load voltage drops and heating of the wire, plug pin, or terminal lug. This heating can lead to component failure and ignition sources.

There are many conditions that may cause an arcing fault. For example, corroded, worn or aged wiring, connectors, contacts or insulation, loose connections, wiring damaged by nails or staples through the insulation, and electrical stress caused by repeated overloading, lightning strikes, etc. These faults may damage the conductor insulation and cause the conductor to reach an unacceptable temperature.

Standard overcurrent devices used in circuit breakers respond to the heating effect of current in a resistive wire to "thermal trip" the breaker, but these do not respond to the sputtering arc currents. We propose a better approach—to stop the arc when it happens rather than wait for a circuit breaker to thermal trip. Until recently, such arc detection capability has not been available in circuit breakers or relays. Ground Fault Circuit Interrupters (GFCI) for personnel protection have been available in the home since the early 1970's. Under ideal conditions, GFCI can detect phase to ground arcs as low as six milliamps, but cannot detect series arcs or improve line to neutral fault trip times.

Arc Fault detection technologies are a new and exciting innovation in circuit protection in the U.S. We have found that Arc Fault Circuit Interrupters (AFCI) can be designed to detect a series or parallel arc, as well as line to neutral arcs by "listening" for the unique signatures which arcs generate. An arc fault circuit interrupter is a device intended to provide protection from the effects of arc faults by recognizing characteristics unique to arcing and by functioning to de-energize the circuit when an arc fault is detected.

Conventional circuit breakers have historically been the best available protection for wiring. Today's design standards are based on technologies that are up to 40 years old. In circuit breakers, the protection is usually provided in two ways. Short circuit currents operate a magnetic trip latch, while overload currents operate either a bimetal trip latch or hydraulic damped magnetic plunger. The "instantaneous trip" is the high current magnetic trip action found on some but not all breakers. The time to trip during an overload is determined by the time it takes to heat a bimetal to the temperature that delatches the breaker. The more current that heats the bimetal, the shorter the time it takes to trip the breaker. A hydraulic-magnetic style of breaker contains a magnetic slug sealed in fluid which moves to a trip position in response to the square of the current. These circuit interruption devices are selected by design engineers to protect the wiring from overheating or melting. During arcing faults these currents are often small, short in duration and well below the over current time protection curve designed into these breakers.

Arcing in a faulted AC circuit usually occurs sporadically in each half cycle of the voltage waveform. The complex arcing event causes sputtering arc's that vary the current from normal load patterns. The precursor to the arc may be a high resistance connection leading to a "glowing contact" and then a series arc, or a carbon track leading to line-to-line or parallel arcing. In a home circuit breaker equipped with Ground Fault Circuit Interrupter (GFCI), a carbon or moisture track can be detected early if the short is to ground. With the introduction of AFCI breakers, protection of arcing shorts from line-to-line, not involving ground, can also be detected and interrupted.

In our arc fault interrupter, the additional electronic devices monitor both the line voltage and current "signatures." In a normal operating circuit, common current fluctuations produce signatures which should not be mistaken for an arc. Starting currents, switching signatures and load changes (normal or "good arc" events) can be digitally programmed in the AFCI as normal signatures waveforms. Deviations or changes from these "normal" signatures are monitored by electronic circuits and algorithms to determine if arcing is occurring. When these arc fault signatures are recognized, the circuit is interrupted and power is removed. The speed of this detection as well as the arc magnitude can be programmable parameters at the time of manufacture. The particular signatures identified as arcs are part of the proprietary arc fault technology of Square D Company.

Commercial, UL approved AFCI circuit breakers are available. These are now in the NEC and will be required in home bedroom circuits in 2002. Since the electrical loads in residential circuits can vary widely, they should be designed to allow for almost an infinite combination of electrical loads. Their AFCI programming may be combined with GFCI as well as magnetic and thermal overload components. They may be designed to form fit and function in place of standard residential circuit breakers.

Summarizing briefly, heat, arcs or electrical ignition are often caused by loose connections, broken or shorted wires in the power distribution system. In wiring, vibration, moisture temperature extremes, improper maintenance and repair all contribute to wiring failure. This leads to arcing and may ignite combustible components. Furthermore, carbon tracking caused by heat generated by the arc can deteriorate the wire insulation, exposing the conductors and resulting in intermittent short circuits between individual wires. These inter-wire shorts can cause damage and malfunctions. Elimination or reduction of these hazards with arc fault technology should become an industry-wide priority.

OBJECTS AND SUMMARY OF THE INVENTION

It is a general object of the present invention to provide an arc fault detection system and method which reliably detects arc fault conditions which may be ignored by conventional circuit interrupters.

A related object of the invention is to provide an arc fault detection system which utilizes highly reliable electronic components, so as to be relatively simple and yet highly reliable in operation.

A more specific object is to provide an arc fault detection system in which a blocking/inhibit function is implemented to prevent the production of a trip signal under predetermined conditions.

Other and further objects and advantages of the invention will be apparent to those skilled in the art from the present specification taken with the accompanying drawings and appended claims.

In accordance with one aspect of the invention, there is provided a system for determining whether arcing is present in an electrical circuit comprising a sensor for monitoring a current waveform in an electrical circuit, an arc fault protection circuit which determines whether an arc fault is present in response to said sensor, the arc fault detection circuit including a controller which produces a trip signal in response to a determination that an arcing fault is present in said electrical circuit, and an inhibitor which prevents production of said trip signal by the controller under one or more predetermined conditions.

DESCRIPTION OF ILLUSTRATIVE EMBODIMENTS

Figure 1:
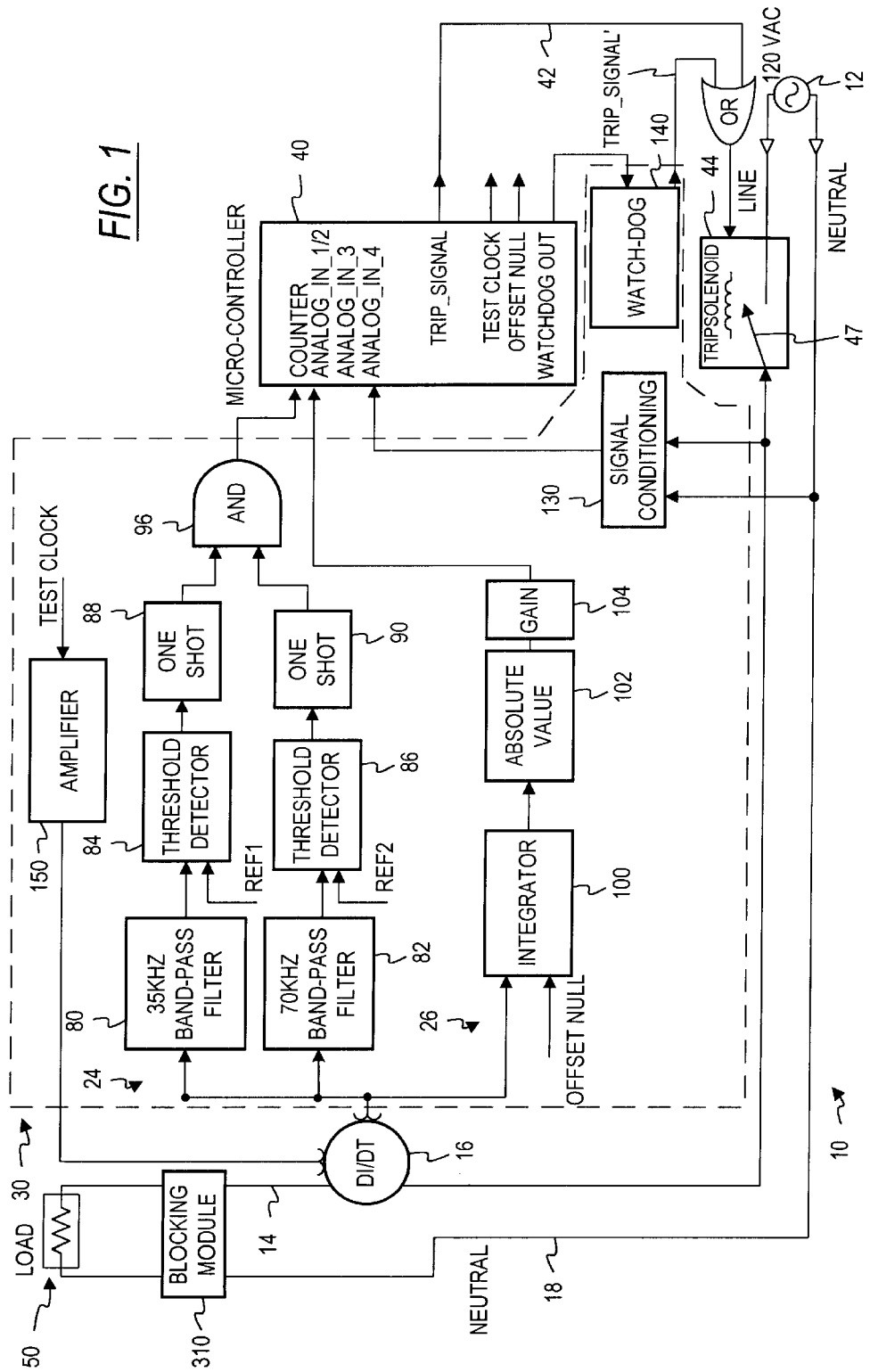
FIG. 1 is a functional block diagram of one embodiment of an arc fault detection system which could be utilized in connection with the invention.

Referring now to the drawings in initially to FIG. 1, there is shown in block form a novel electrical fault detector system in accordance with one embodiment of the invention, and designated generally by the reference numeral 10. In the illustrative example, the fault detection system 10 is associated with an electrical circuit such as a 120 VAC circuit 12 which is to be monitored for faults. Of course, the invention is not limited to use with a 120 VAC circuit. At least one sensor 16 is provided in association with the 120 VAC circuit 12 for producing a signal representative of a signal condition, such as power, voltage or current in the 120 VAC circuit 12. In the illustrated embodiment, this sensor 16 comprises a current rate of change sensor (di/dt). A line conductor 14 of the 120 VAC circuit 12 passes through the rate of change current sensor (di/dt) 16 which produces a current input signal representative of the rate of change of current flow in the line conductor 14.

The di/dt sensor 16 and the ground fault sensor 20 may each comprise a toroidal coil having an annular core which surrounds the relevant conductors, with a toroidal sensing coil wound helically on the core. In the sensor 16, the core may be made of magnetic material such as ferrite, iron or molded permeable powder, such that the sensor to is capable of responding to rapid changes in flux. An air gap may be cut into the core in certain instances to reduce the permeability, and the core material is such that it does not saturate during the relatively high current produced by some forms of arcing, so that arc detection is still possible.

The di/dt sensor 16 provides an input to a broadband noise detector circuit 24 and a current measuring circuit 26. In the illustrated embodiment, all of the components of the broadband noise detector circuit 24, the current detector circuit 26, as well as some other circuit components to be described later, are provided on an application specific integrated circuit (ASIC) 30. Suitable output signals from the ASIC 30 are fed to a microcontroller 40 which, based on analysis and further processing of the signals provided by the ASIC 30 makes a decision as to whether to send a trip signal to an output 42 for activating a trip circuit 44 which will in effect switch the line side conductor 14 of the 120 VAC circuit 12 to an open circuit condition as indicated diagrammatically in FIG. 1, or whether to allow the line side 14 of the circuit 12 to remain connected to a load 50.

Referring still to FIG. 1, additional components of the ASIC 30 will next be described.

The broadband noise detector 24 comprises first and second band-pass filter circuits 80, 82 which receive the rate of change of current signal from the di/dt sensor 16. The band passes of these circuits 80 and 82 are selected at frequency bands which are representative of broadband noise typical of arcing faults. In the illustrative embodiment, these band-pass frequencies are selected as typically 35 kilohertz and 70 kilohertz respectively. Each of the band-pass filter circuits 80 and 82 feeds a filtered signal, comprising those components of an input signal from the di/dt sensor which fall within their respective band-pass frequency pass bands, to respective threshold detector circuits 84 and 86.

The threshold detectors 84 and 86 are responsive to those components of the frequency signals passed by the band-pass filters 80 and 82 which are above a predetermined threshold amplitude for producing a corresponding frequency amplitude output to signal conditioning circuits 88 and 90. These circuits 88 and 90 produce a conditioned output signal in a form suitable for input into the microcontroller 40. In the illustrative embodiment, these latter signal conditioning circuits 88 and 90 comprise ten microsecond one-shot circuits for producing a unit pulse signal. The output pulses generated by the one-shots 88 and 90 are ANDed at an AND circuit 96 whose output is fed to a "counter" input of the microcontroller 40 as indicated in FIG. 1. In the illustrative embodiment, a one volt threshold is utilized by both of the threshold circuits 84 and 86.

Referring still to FIG. 1, the current fault sensor or current measuring portion 26 of the ASIC 30 also receives the output signal of the di/dt sensor 16. An integrator circuit 100 develops a signal representative of current magnitude in response to the output of the di/dt sensor 16. This signal is fed to a further signal conditioning circuit portion 102 which includes an absolute value circuit as shown in FIG. 1 and a gain circuit 104 for producing a conditioned current output signal in a form suitable for input to the controller 40.

The absolute value circuit 102 takes signals that are both negative- and positive-going and inverts any negative going signals to positive signals while passing through positive-going signals unchanged.

The output of the absolute value circuit 102 is fed into the gain circuit 104 which in one embodiment includes a low current gain stage and a high current gain stage. Briefly, the low current gain stage applies a relatively greater amount of gain to relatively low currents so as to increase the resolution of the current signal for relatively low current levels. On the other hand, the high current gain stage applies a relatively lower gain to relatively higher current levels in order to maintain a full range of current signal levels through the circuit. The outputs of the respective low current and high current gain stages are fed to the microcontroller 40.

The line voltage is also conditioned at a circuit 130 and fed to the microcontroller for further analysis and processing. This circuit 130 includes a line voltage divider (not shown) which divides the line voltage to a lower level suitable for further processing, a difference amplifier (not shown) which takes the output of the line voltage divider and level shifts it to circuit ground to be rectified, and an absolute value circuit. The voltage from the difference amplifier (not shown) is fed through the absolute value circuit which has the same configuration and function as described above for the previously described absolute value circuits. The output of signal conditioning circuit 130 is fed to the microcontroller 40.

Referring still to FIG. 1, a watchdog circuit 140 takes a pulse input (Pulse_In) from the microcontroller 40 to check to see if the microcontroller is still active. If no pulses are present on this output from the microcontroller then a trip signal (Trip_Signal') is sent to the trip circuit by the watchdog circuit 140.

A "push to test" amplifier circuit 150 receives a "test clock" signal from the microcontroller when a "push to test" switch (not shown) is actuated and conditions it for input to a test winding on the di/dt sensor 16. If all of the circuitry operates properly, the microcontroller should receive back signals indicating an arcing fault. In accordance with a test program when these signals are received, the microcontroller will produce a "trip" signal on line 42.

As indicated above, FIG. 1 illustrates one embodiment of an application specific integrated circuit for performing the above-described operations. Further details of the construction and operation of the circuit of FIG. 1 are described copending application, Ser. No. 09/026,193, filed Feb. 19, 1998 (attorney's docket NBD27/SQRE020), which is incorporated herein by reference.

Provision of the detector circuit as an ASIC is advantageous, in that it permits the circuitry to be readily incorporated into a variety of environments. This is mainly due to the small size and relatively modest power requirements of the ASIC. That is, this detector circuit can be incorporated not only in panel boards or other distribution apparatus, but could also be located at individual loads. This is true for industrial, as well as and commercial and residential applications. For example, the detector circuit ASIC could be incorporated in electrically powered industrial and/or commercial equipment or machinery, as well as in consumer products such as computers, audiovisual equipment, appliances or the like.

The microcontroller 40 analyzes current waveforms and broadband noise to determine if arcing is present in electrical conductors. A high current arc is identified as a current waveform that has a combination of changes in current (di/dt) and broadband noise (10 kHz to 100 kHz). The controller 40 increments a plurality of counters, which may be implemented in software, in accordance with the input signals received from the ASIC 30. Table 1 summarizes high current arcing characteristic of current waveforms and how firmware counters are incremented. A detailed description of how the counters are used to determine if an arc is present is described later.

Conditions exist where loads have broadband noise, large (di/dt) and high currents under normal operating conditions. To distinguish between normally noisy load currents and arcing currents, the algorithms looks for different levels of (di/dt) broad band noise, high currents, decaying currents and current aspect ratios*.

Broadband noise is calculated as logically anding two or more frequency bands in hardware as described above. If broadband noise is present then pulses are received at the microcontroller input. The pulses are counted every half cycle, stored and then reset to detect broadband noise levels in the next half cycle.

TABLE 1

(each row characterizes an arcing half cycle)

| peak current with aspect ratio* >2 | (di/dt) (dt** = 500 us) | high frequency broad band noise*** | high current arc counter | (di/dt) count | high frequency counter |
|---|---|---|---|---|---|
| >48A | >0.328 × peak current | not required | increment | increment | unchanged |
| >48A | >0.328 × peak current | present | increment | increment | increment |
| >48A | >0.203 × peak current | required | increment | unchanged | increment |
| >48A | >0.25 × peak current | required | increment | increment | increment |

*Aspect ratio is the area divided by the peak for one half cycle. Area is the sum of 32 samples for one half cycle.
**dt is the time between every other sample of the current waveform. This sample time varies dynamically with the line frequency (60 ± 4 Hz) to get better coverage of the current waveform.
***High frequency broadband noise is the presence of broadband noise during the first 20 half cycles on power-up of the module with a load connected and turned on, and normal operation due to noisy loads at steady state (currents below 48APeak).

A block diagram of a typical application for a residential arc fault circuit breaker is shown in FIG. 1. Arcing and startup current waveforms are analyzed by the controller using the algorithms described in the following description.

The firmware contains the following counters and other variables:
  di/dt1 (holds the maximum di/dt one half cycle ago)
  di/dt2 (holds the maximum di/dt two half cycles ago)
  di/dt3 (holds the maximum di/dt three half cycles ago)
  di/dt4 (holds the maximum di/dt four half cycles ago)
  di/dt_counter (holds the integer number of times di/dt count has been incremented, specified in TABLE 1)
  peak1 (holds the peak current of one half cycle ago)
  peak2 (holds the peak current of two half cycle ago)
  peak3 (holds the peak current of three half cycle ago)
  peak4 (holds the peak current of four half cycle ago)
  peak5 (holds the peak current of five half cycle ago)
  high_current_arc_counter (holds the integer number of times an arcing half cycle was detected from TABLE 1)
  high_frequency_counter (holds the integer number of counts of high frequency of the previous half cycles)
  high_frequency_noise_counter (holds the integer number of high frequency counts during startup or steady state (currents less then 48A))
  missing_half cycle (true when nonarcing half cycle follows arcing half cycle)
  slow_rise (holds the value of peak1—di/dt1)
  peak_ground_fault (holds the peak ground fault current of last half cycle)

The counters described above are incremented and cleared in the following way:
  If (peak>48A) then check the following:
    If (di/dt1>(0.328×peak1) and high_frequency_counter>4 and high frequency noise counter<16)
      increment di/dt_counter
      increment high_frequency_counter
      increment high_current_arc_counter
    ElseIf (di/dt1>(0.328×peak1))
      increment di/dt_counter
      increment high_current_arc_counter
    ElseIf (di/dt1>(0.25×peak1) and high_frequency_counter>4 and high_frequency_noise_counter<16)
      increment di/dt_counter
      increment high_frequency_counter
      increment high_current_arc_counter
    ElseIf (di/dt1>(0.203×peak1) and high frequency counter>4 and high frequency noise counter<16)
      increment high_frequency_counter
      increment high_current_arc_counter
  If no arcing half cycle in 0.5 seconds after last arcing half cycle, then clear all counters A line to neutral arc or ground fault arc is present under the following conditions of the above firmware counters:
  If (ground fault>threshold)
  If (peak currents>35A for 3 half cycles and missing_half cycle is true and di/dt_counter>1 and high_current_arc_counter>1)
  If (peak currents>35A for 4 half cycles and missing_half cycle is true and high current_arc_counter>2)
  If (peak currents>35A for 5 half cycles and missing_half cycle is true and high_current_arc_counter>3)
  If (peak currents>35A for 5 half cycles and high current_arc_counter>3 and di/dt1>di/dt3 and di/dt_counter>2)
  If (peak currents>35A for 5 half cycles and high_current_arc_counter>3 and di/dt1>di/dt3 and high_frequency_counter>2 and di/dt_counter>1)

If (peak currents>35A for >5 half cycles and <9 half cycles and high_current_arc_counter>3 and missing_half cycles is true)

If (peak currents>35A for >5 half cycles and <9 half cycles and high_current_arc_counter>3 and di/dt_counter>3)

If (peak currents>35A for >5 half cycles and <9 half cycles and high_current_arc_counter>3 and high_frequency_counter>1 and di/dt_counter>2)

If (peak currents>35A peak for >5 half cycles and <9 half cycles and high current_arc_counter>3 and high frequency counter>2 and di/dt_counter>1)

If (high_current arc>6)

Start-up Algorithms:

If (peak1 to peak4>35A and missing_half cycle=false) then check the following:
  If (((peak1<(peak3−7A)) and (peak1<peak2)) and ((peak2<peak3) and (peak2<peak4−7A)))
    tungsten lamp startup, clear the following counters
      high_current_arc_counter
      di/dt_counter
      high_frequency_counter
  ElseIf((peak3>peak1) and (peak5>peak3) and (di/dt1<peak1/2) and (di/dt2<peak2/2) and (di/dt3<peak3/2) and ((di/dt5+1.4A)>=di/dt3) and ((di/dt3 +>=di/dt1) and (slow_rise1>48A))
    inductive load startup, clear the following counters
      di/dt_counter
      high_frequency_counter Note: The numerical values in the above expressions are selected for residential applications. However, specific numerical values, current levels and counter values are not limited to the above specifications, but may vary for other applications. Also, the invention is not limited to the above-described embodiments of the ASIC 30 and controller 40

In accordance with the invention, a blocking or inhibiting function is also implemented in connection with the arc fault detector or arc fault circuit interrupter of the invention. Two possible forms of blocking are shown in FIG. 1, which might be implemented together or individually.

Figure 2:
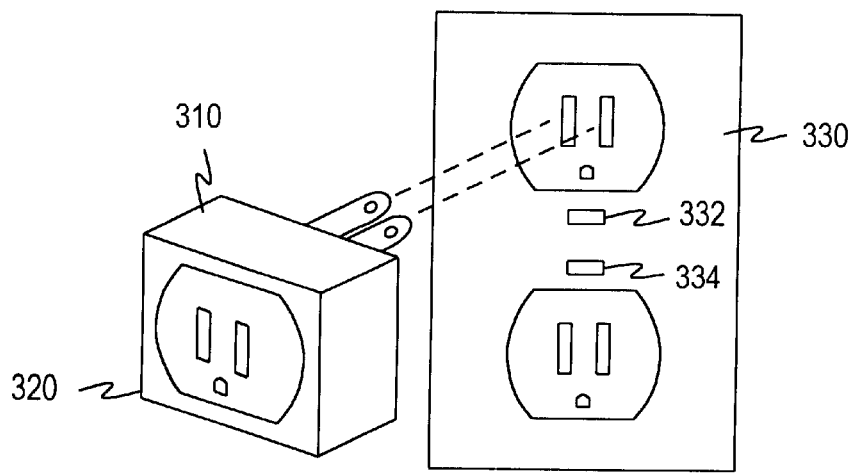
FIG. 2 is a simplified view showing a plug-in blocking module which may be plugged into an electrical outlet.

In accordance with one form of a blocking arrangement, a blocking module 310 is interposed in the electrical circuit 12. Referring briefly to FIG. 2, this module 310 may be incorporated in a plug-in module 320 which plugs into a receptacle of an AFCI outlet 330, which outlet incorporates the arc fault detection and protection elements of FIG. 1, or some other arc fault circuit interrupter (AFCI) arrangement. The load would then be plugged into a receptacle provided in the plug-in module 320. The module 310 would modify the current waveform from an appliance plugged into its receptacle to prevent the arcing fault protected receptacle 330 from tripping in response to the current waveform is caused by certain "noisy" loads. The module 310 might comprise a simple low pass filter, which could be of either passive or active design. Alternately, a bandpass filter designed or tailored to block only the signal from given load, but not broadband noise characteristic of arcing faults, as discussed above, might be utilized in the module 310.

As yet another alternative, the module 310 could include a digital signal processor having an algorithm specifically designed to prevent signals from a noisy load from reaching and tripping the arc fault protected outlet or receptacle 330 while permitting broadband noise and other current waveforms characteristic of true arcing faults to reach the arc fault detection circuitry or apparatus associated with the receptacle 330. In this regard, the arc fault detection or AFCI of FIG. 1 may be incorporated in the receptacle 330, in another receptacle wired in series on the line side of the receptacle 330, or in the panel board or breaker box which supplies the branch circuit in which the receptacle 330 is located.

Figure 3:
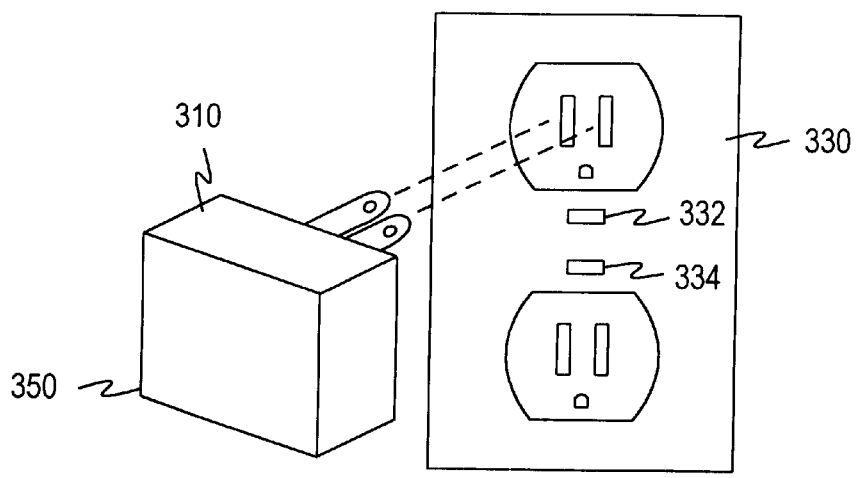
FIG. 3 is a view similar to FIG. 2 showing a blocking module in accordance with another embodiment of the invention.
Figure 7:
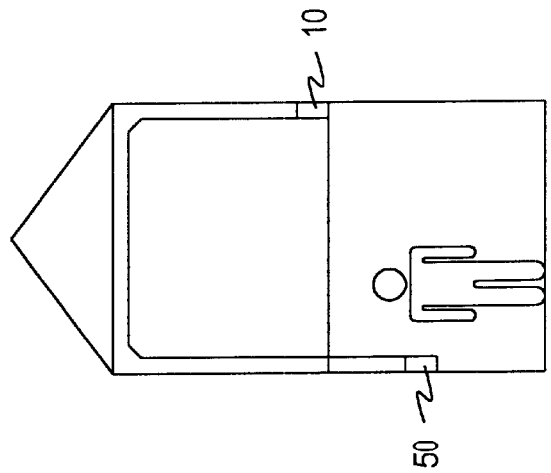
FIG. 7 shows communications with the system of FIG. 1 using X-10 protocol.

A second form of blocking module 310 might take the form of a communications device or module 350 (FIG. 3) which communicates with the controller 40 via the arc fault-protected AC branch circuit 12, as shown in FIG. 7. This communication module 350 could comprise an X10 protocol communications module. As shown in FIG. 3, the communication module 350 could also plug directly into the arc fault protected outlet 330 (i.e., the outlet in which the arc fault circuit interrupter is located). The module 350 could also plug into another outlet on the same A.C. branch circuit 12, on the load side of the AFCI outlet 330. This would permit communications between the communication module 350 and the controller 40 via the A.C. line. The module could also communicate through the ground fault signal, for example in the form of a pulse signal below the ground fault trip threshold where the outlet 330 is also a ground fault protected or GFCI type of outlet.

Figure 4:
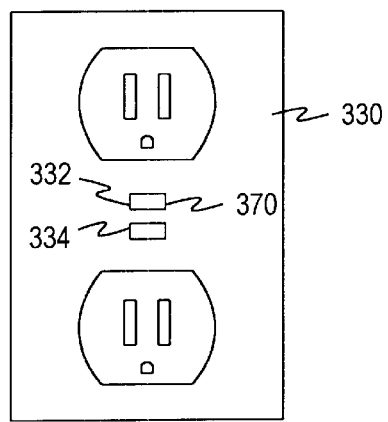
FIG. 4 is a view of an arcing fault protected outlet having one or more switches, including an inhibitor function switch.
Figure 5:
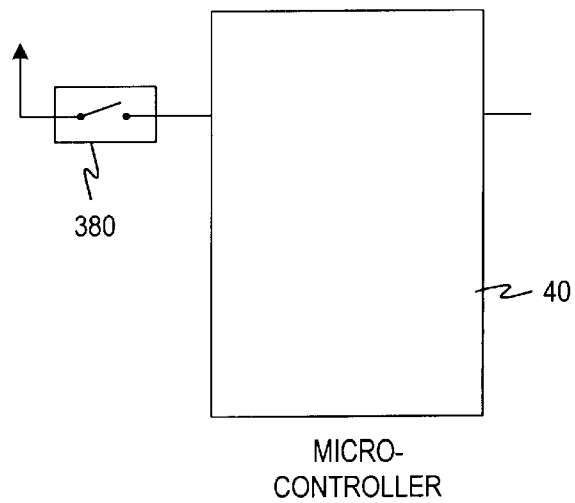
FIG. 5 is a simplified schematic showing of the inhibitor switch of FIG. 4 in connection with a microcontroller portion of the arcing fault protection system.

Referring to FIGS. 4 and 5, as an alternative to the blocking module 310, certain loads might be prevented from tripping the AFCI by use of an inhibit "key" type of an arrangement, which might be implemented as a pushbutton or switch 370 in the arcing fault protected or AFCI receptacle 330. The pushbutton may be combined with an existing reset button, if desired, in a receptacle 330 having test and reset buttons 332, 334. This pushbutton 370 might activate a switch 380 which is operatively coupled with a suitable analog input port of the controller or microcontroller 40, in order to inhibit the trip output.

One or more wireless forms of communication might also be utilized to implement the ground fault inhibiting "key" in place of the module 350. Thus, when remotely activated this "key" could disable the AFCI from tripping. The key could be set for given time limit, for example, it wouldn't trip for 10 minutes, or the user could define the length of time during which the AFCI trip function is disabled. This "key" could also be implemented either as the button or switch as described above with reference to FIGS. 4 or 5, or alternatively, as a wireless arrangement as just mentioned.

Figure 6:
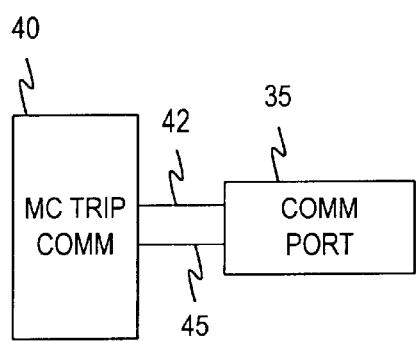
FIG. 6 is a simplified showing of a controller of the system of FIG. 1, having a communication port or device.

In order to implement a wireless "key" or inhibitor, and referring to FIG. 6, a communications terminal 45 of the controller 40 is coupled with a communications port 35.

Figure 8:
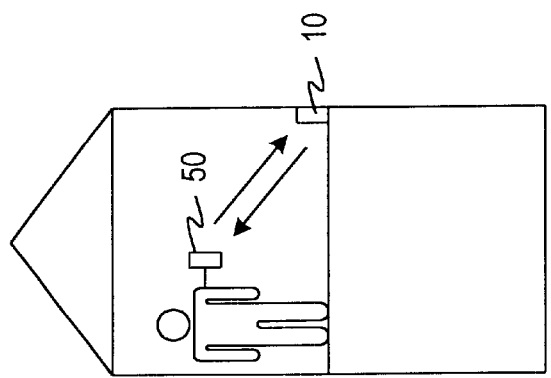
FIG. 8 shows communications with the system of FIG. 1 using visible, infrared or other "line of sight" means.

The communication port 35 may take a number of forms in accordance with the invention. In one embodiment, the communication port 35 may utilize an optical device such as light sensitive semiconductor in a visible light spectrum or in the infrared spectrum. As indicated in FIGS. 7–8, this optical device 35a can respond to a hand-held or other type of control unit or communications device 50 which would comprise the "key" or inhibitor and communicate a variety of types of information, in human perceptible or human imperceptible form. That is, this information might be conveyed in the form of a human imperceptible pulsing or flickering of an LED or the like. While not human perceptible, this higher frequency pulsing of the LED would be readable by the communications port 35a. Any of a number of communications protocols could be used in this connection, as well as proprietary communications protocols, if desired. The information communicated could select or update a trip algorithm to accommodate various loads or other conditions.

Other information which might be communicated to the controller 40 via the communication port 35 includes commands to perform various functions, such as a self-test routing, in addition to commands to enable or disable the trip function as required for various loads or conditions, or updates to the trip algorithm, to vary the fashion in which the controller 40 produces a trip signal, or make the decision to produce a trip signal. These algorithm updates might be in the form of software updates, or the like. Cooperatively, in this regard, the controller 40 could contain one or more programmable memory components for receiving such updated information. Alternatively, the controller could be preprogrammed with multiple trip algorithms for use in different situations, with the communications device 50 passing a control signal to the communications port for selecting one of these algorithms for use in a particular situation.

Figure 9:
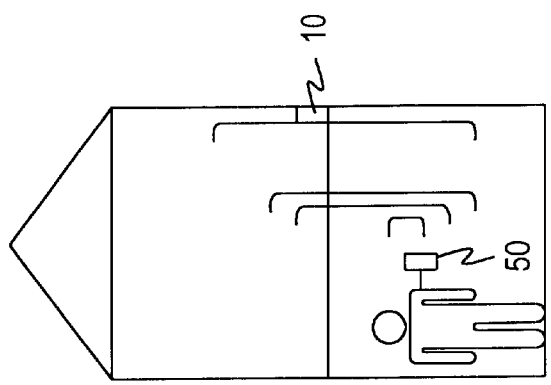
FIG. 9 shows communications with the system of FIG. 1 using an RF transmitter.

Yet other forms of communication which might be utilized to communicate information to the port 35 from the control unit 50 including a radio frequency transmitter and receiver as indicated in FIG. 9, and the above-described X-10 protocol through the AC line, as indicated in FIG. 7. In this regard, FIG. 8 indicates a "line of sight" type of communication, whether visible light, infrared, or otherwise.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A system for determining whether arcing is present in an electrical circuit comprising:

a sensor which monitors a current waveform in said electrical circuit;

an arc fault detection circuit which determines whether an arc fault is present in response to said sensor by recognizing a signature of the waveform, said arc fault detection circuit including a controller which stores signature recognition data and produces a trip signal in response to a determination, based upon said signature recognition data, that an arcing fault is present in said electrical circuit; and a trip inhibitor which prevents production of said trip signal by the controller under one or more predetermined conditions;

wherein said sensor detects current in said circuit and develops a corresponding sensor signal, and wherein said arc fault detection circuit comprises a circuit which determines the presence of broadband noise in said sensor signal and produces a corresponding output signal, and a controller which processes said sensor signal and said output signal in a predetermined fashion to determine whether an arcing fault is present in said electrical circuit; and wherein the controller implements a plurality of counters and increments said plurality of counters in a predetermined fashion in accordance with said sensor signal and said output signal, and periodically determines whether an arcing fault is present based at least in part on the state of said plurality of counters.

2. The system of claim 1 wherein said counters are implemented in software.

3. The system of claim 1 wherein said trip inhibitor comprises an operator accessible control for producing an inhibit signal.

4. The system of claim 3 wherein said operator accessible control comprises a manually activatable control member wired in circuit with said arc fault detection circuit.

5. The system of claim 4 wherein said sensor and said arc fault detection circuit are mounted in an electrical receptacle, wherein said control member is mounted to said receptacle.

6. The system of claim 3 wherein said operator accessible control communicates with said controller via wireless communications.

7. The system of claim 1 wherein said sensor and said arc fault detection circuit are mounted in an electrical receptacle.

8. A system for determining whether arcing is present in an electrical circuit comprising:

a sensor which monitors a current waveform in said electrical circuit;

an arc fault detection circuit which determines whether an arc fault is present in response to said sensor by recognizing a signature of the waveform, said arc fault detection circuit including a controller which stores signature recognition data and produces a trip signal in response to a determination, based upon said signature recognition data that an arcing fault is present in said electrical circuit; and a trip inhibitor which prevents production of said trip signal by the controller under one or more predetermined conditions;

wherein said trip inhibitor comprises a device for modifying said current waveform so as to appear to said arc fault detection circuit to be a non-arc fault waveform.

9. The system of claim 5 wherein said device comprises a passive filter.

10. The system of claim 8 wherein said device comprises an active filter.

11. The system of claim 8 wherein said device comprises a digital signal processor.

12. A system for determining whether arcing is present in an electrical circuit comprising:

a sensor which monitors a current waveform in said electrical circuit;

an arc fault detection circuit which determines whether an arc fault is present in response to said sensor by recognizing a signature of the waveform, said arc fault detection circuit including a controller which stores signature recognition data and produces a trip signal in response to a determination, based upon said signature recognition data, that an arcing fault is present in said electrical circuit; and a trip inhibitor which prevents production of said trip signal by the controller under one or more predetermined conditions;

wherein said trip inhibitor comprises a communication device which communicates information corresponding to at least one of said predetermined conditions to said controller.

13. The system of claim 12 wherein said communication device includes a visible light emitting device.

14. The system of claim 12 wherein said communication device comprises an X-10 protocol device.

15. The system of claim 12 wherein said communication device comprises an infrared transmitter.

16. The system of claim 12 wherein said communication device produces said information in the form of a pulse signal.

17. The system of claim 12 wherein said communications device comprises a radio frequency transmitter.

18. A system for determining whether arcing is present in an electrical circuit comprising:
   a sensor which monitors a current waveform in said electrical circuit;
   an arc fault detection circuit which determines whether an arc fault is present in response to said sensor by recognizing a signature of the waveform, said are fault detection circuit including a controller which stores signature recognition data and produces a trip signal in response to a determination, based upon said signature recognition data, that an arcing fault is present in said electrical circuit; and
   a trip inhibitor which prevents production of said trip signal by the controller under one or more predetermined conditions;
   wherein said trip inhibitor is a plug-in module.

19. A method for determining whether arcing is present in an electrical circuit comprising:
   monitoring a current waveform in said electrical circuit;
   determining whether an arc fault is present in response to the monitored current waveform by recognizing a signature of the waveform;
   producing a trip signal in response to a determinations based upon said signature recognition, that an arcing fault is present in said electrical circuit; and
   preventing production of said trip signal under one or more predetermined conditions;
   wherein said monitoring includes detecting current in said circuit and developing a corresponding current signal, and wherein said determining comprises determining the presence of broadband noise in said current waveform and producing a corresponding broadband noise signal, and processing said current signal and said broadband noise signal in a predetermined fashion To determine whether an arcing fault is present in said electrical circuit, and
   wherein said determining includes implementing a plurality of counters and incrementing said plurality of counters in a predetermined fashion in accordance with said current signal and said broadband noise signal, and periodically determining whether an arcing fault is present based at least in part on the state of said plurality of counters.

20. The method of claim 19 wherein said counters are implemented in software.

21. The method of claim 19 wherein said preventing comprises communicating information corresponding to at least one of said predetermined conditions to means which performs said determining.

22. The method of claim 21 wherein said communicating includes emitting visible light.

23. The method of claim 21 wherein said communicating comprises using X-10 protocol.

24. The method of claim 21 wherein said communicating comprises transmitting infrared radiation.

25. The method of claim 21 wherein said communicating comprises producing said information in the form of a pulse signal.

26. The method of claim 21 wherein said communicating comprises transmitting radio frequency signals.

27. The method of claim 19 wherein said preventing comprises an operator activatable control producing an inhibit signal.

28. The method of claim 19 including performing said monitoring and determining in an electrical receptacle.

29. A method for determining whether arcing is present in an electrical circuit comprising;
   monitoring a current waveform in said electrical circuit;
   determining whether an arc fault is present in response to the monitored current waveform by recognizing a signature of the waveform;
   producing a trip signal in response to a determination, based upon said signature recognition, that an arcing fault is present in said electrical circuit; and
   preventing production of said trip signal under one or more predetermined conditions;
   wherein said preventing comprises modifying said current waveform so as to appear to be a non-arc fault waveform.

30. The method of claim 29 wherein said modifying comprises frequency filtering said current waveform.

31. The method of claim 29 wherein said modifying comprises digitally processing said current waveform.

32. A method for determining whether arcing is present in an electrical circuit comprising:
   monitoring a current waveform in said electrical circuit;
   determining whether an arc fault is present in response to the motored rent waveform by recognizing a signature of the waveform;
   producing a trip signal in response to a determination, based upon said signature recognition, that an arcing fault is present in said electrical circuit; and
   preventing production of said trip signal under one or more predetermined conditions performing said monitoring and determining in an electrical receptacle;
   wherein said preventing comprises an operator activatable control mounted to said electrical receptacle by prongs producing an inhibit signal.

33. A method for determining whether arcing is present in an electrical circuit comprising:
   monitoring a current waveform in said electrical circuit;
   determining whether an arc fault is present in response to the monitored current waveform by recognizing a signature of the waveform;
   producing a trip signal in response to a determination, based upon said signature recognition, that an arcing fault is present in said electrical circuit; and
   preventing production of said trip signal under one or more predetermined conditions performing said monitoring and determining in an electrical receptacle;
   wherein said preventing comprises inserting a plug-in module into said electrical receptacle.

34. A method for determining whether arcing is present in an electrical circuit comprising:
   monitoring a current waveform in said electrical circuit;
   determining whether an arc fault is present in response to the monitored current waveform by recognizing a signature of the waveform;
   producing a trip signal in response to a determination, based upon said signature recognition, that an arcing fault is present in said electrical circuit; and
   preventing production of said trip signal under one or more predetermined conditions performing said monitoring and determining in an electrical receptacle;
   wherein said preventing comprises an operator activatable control communicating information corresponding to at least one of said predetermined conditions with means in said electrical receptacle for performing said monitoring and determining.

35. A system for determining whether arcing is present in an electrical circuit comprising:
- a sensor which monitors a current waveform in said electoral circuit;
- an arc fault detection circuit which determines whether an arc fault is present in response to said sensor by recognizing a signature of the waveform, said arc fault detection circuit including a controller which stores signature recognition data and produces a trip signal in response to a determination, based upon said signature recognition data, that an arcing fault is present in said electrical circuit; And
- a trip inhibitor which prevents production of said trip signal by the controller under one or more predetermined conditions;
- wherein said sensor detects current in said circuit and develops a corresponding sensor signal, and wherein said arc fault detection circuit comprises a circuit which determines the presence of broadband noise in said sensor signal and produces a corresponding output signal, and a controller which processes said sensor signal and said output signal in a predetermined fashion to determine whether an arcing fault is present in said electrical circuit;
- wherein the controller implements a plurality of counters and increments said plurality of counters in a predetermined fashion in accordance with said sensor signal and said output signal, and periodically determines whether an arcing fault is present based at least in part on the state of said plurality of counters.

36. A method for determining whether arcing is present m an electrical circuit comprising:
- monitoring a current waveform in said electrical circuit;
- determining whether an arc fault is present in response to the monitored current waveform by recognizing a signature of the waveform;
- producing a trip sign in response to a determination, based upon said recognizing, that an arcing fault is present it said electrical circuit; and
- preventing production of said trip signal under one or more predetermined conditions;
- wherein said monitoring includes detecting current in said circuit and developing a corresponding current signal, and wherein said determining comprises determining the presence of broadband noise in said current waveform and producing a corresponding broadband noise signal, and processing said current signal and said broadband noise signal in a predetermined fashion to determine whether an arcing fault is present in said electrical circuit;
- wherein said determining includes implementing a plurality of counters and incrementing said plurality of counters in a predetermined fashion in accordance with said current signal and said broadband noise signal, and periodically determining whether an arcing fault is present based at least in part on the state of said plurality of counters.

* * * * *